UNITED STATES PATENT OFFICE.

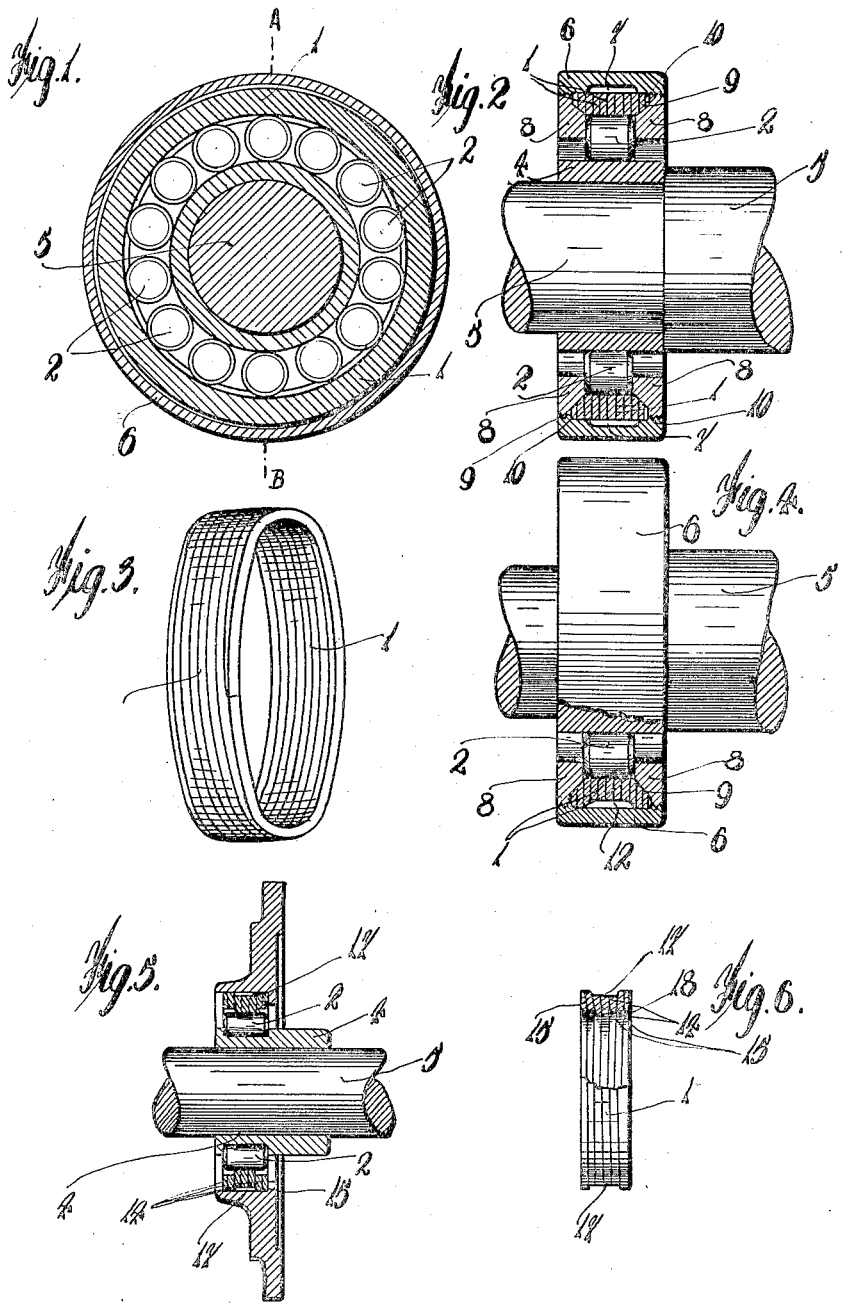

ALBERT EDWARD DABBS AND STANLEY WHITBY SAVAGE, OF MANCHESTER, AND ALFRED HAROLD HINDLE, OF BIRMINGHAM, ENGLAND, ASSIGNORS OF ONE-EIGHTH TO ABSALOM LIDDLE, OF MANCHESTER, ENGLAND, AND ONE-HALF TO JOHN GEORGE WILLIAM GRUBAN, OF KINGSWAY, LONDON, ENGLAND.

ROLLER OR BALL BEARING.

1,327,026.  Specification of Letters Patent.  Patented Jan. 6, 1920.

Application filed December 5, 1918. Serial No. 265,460.

*To all whom it may concern:*

Be it known that we, ALBERT EDWARD DABBS, STANLEY WHITBY SAVAGE, and ALFRED HAROLD HINDLE, all subjects of the King of Great Britain, residing at 19 Rowan avenue, Whalley Range, Manchester, 55 Brook road, Chorlton-cum-Hardy, Manchester, in the county of Lancaster, and 51 Sandford road, Moseley, Birmingham, in the county of Warwick, England, respectively, have invented a new and useful Improvement in Roller or Ball Bearings; and we do hereby declare the following to be a full, clear, and exact description of the same.

Our invention comprises improvements in roller or ball bearings and refers more particularly to that class of such which are built in the form of a unit comprising an outer ring and an inner ring with a circle of rollers or balls between the inner and outer rings, the object of the present invention being to provide an improved adjustable bearing of this kind.

According to this invention the ring which is freely carried by or is supported by the housing of the bearing is in the form of a close helix so as to permit adjustment of the bearing and to lend a certain amount of resiliency to the bearing and thereby provide automatic self-adjustment of the bearing for inequalities in the shaft due either to the incorrect positioning of the bearing or the "whirling" of the shaft due to long distance bearings.

The one ring or member, preferably the outer one, is constructed in the form of a helix, the middle portion of which, supporting the rollers or balls, is formed with a slight clearance in relation to the supporting housing, while the end members of the helix are adapted to be rigidly supported by the housing. The clearance permits the helix to automatically adjust itself so as to maintain contact with the ring of rollers or balls, the bearing being thus self-adjusting while the shaft or other member is resiliently supported by the bearing.

In the accompanying two sheets of drawings—

Figure 1 is a sectional elevation of one form of bearing in accordance with this invention.

Fig. 2 is a section at A—B in Fig. 1.

Fig. 3 is a perspective view of the helix removed.

Fig. 4 is a side elevation in part section of a modification.

Fig. 5 shows a sectional elevation of a third form of bearing.

Fig. 6 illustrates the helix removed.

As illustrated upon the accompanying drawings at Figs. 1-3 in one form of bearing according to this invention the ring 1 within which the rollers 2 or balls are supported is formed by helically coiling a strip of spring steel of the necessary section in order to provide a plain interior surface for making contact with the rollers or balls. There may be any suitable number of coils three, six, or nine being convenient numbers, or a similar result may be obtained by helically cutting a sleeve.

The rollers 2 or balls are disposed around a central ring or sleeve 4 which is fixed to the shaft 5 and the helical member 1 is of such a size as to fit within the housing and when placed therein to have a normal internal diameter slightly less than the external diameter of the ring of rollers or balls.

The central coil or coils of the helix contact with the rollers 2 or balls and a slight clearance is provided between the exterior of these coils and the interior of the housing. To obtain this clearance the housing 5 may be internally grooved as 7. In practice when the bearing is assembled this clearance will permit the central portion of the helix, i. e., the part making contact with the rollers or balls, to expand to an extent corresponding with the difference between the internal diameter of the helix and the external diameter of the ring of rollers or balls, and the bearing will thus be self-adjusting so that the helix will always be in contact with the rollers or balls. The end members of the helix will be rigidly supported by the housing while the shaft and rollers or balls will be resiliently supported within the housing.

The rollers 2 or balls are held in position by two annular rings 8, 8 which are adapted to screw into the ends of the housing 6 and are provided with internally tapered parts 9 which engage with external tapers 10 on the helical member 1 whereby the helix may be expanded to adjust the tension of the helix.

As illustrated in Fig. 4 instead of providing the housing with an internal groove the clearance may be obtained by reducing the outer periphery of the helix as indicated at 12.

In Figs. 5 and 6, which show another form of bearing, the rollers 2 or balls and the helix are supported in very much the same manner as in the previous case, but the contacting sides are formed to inter-engage and accordingly the inner members 14, which as shown are three in number, slope inwardly, that is the inside surface of the ring at this point is narrower than the outside, while the two end members 15 are provided with inner faces which slope outwardly as 18 so bringing the outer ends of the helix parallel as before. In this arrangement the rollers 2 contact with the inner members 14 and a space is provided between the outer surface of the helix and the inner surface of the housing 6 which permits expansion of the helix.

In the form shown by Figs. 5 and 6 the helix is provided with a reduced outer periphery at 17, while the inner members are formed of smaller diameter than the outer ones to provide the necessary adjustment.

Instead of making the coiled strips with parallel or sloping sides they may be formed to inter-engage by making the sides concave or convex.

We claim:—

1. In a bearing, rotatable anti-friction members; a close helix forming a race for said members; and a housing for said helix in contact with parts of the helix, whereby clearance is provided between the helix and its housing and said helix forms a resilient support.

2. In a bearing, rotatable anti-friction members; a solid race ring for said members; a close helix for said members; and a housing rigidly supporting said close helix at its extremities, clearance being provided between said housing and the middle portion of said helix whereby a resilient support for said anti-friction members is obtained.

3. In a bearing, rotatable anti-friction members; a solid ring forming a race for said members; a close helix comprising a plurality of coils and forming a second race for said members; and inclined sides on some of said coils, the middle coils being wider in cross-section at the outer periphery and the end coils being wider in cross-section at the inner periphery.

4. In a bearing, a solid inner race; a helically coiled outer race having the end coils of greater external diameter than the middle coils; a housing supporting the end coils; and a ring of rotatable members running between said races.

5. In a bearing, a solid inner race; a helically coiled outer race the internal diameters of the coils of which are smallest at the center and increase toward each end of the race; a housing supporting the ends of the outer race externally; adjustable cone shaped members supporting the ends of the outer race internally and adapted to adjust the outer race ring; and a ring of rotating members riding between said races.

6. A shaft bearing comprising in combination, a solid inner race ring adapted to be rigidly mounted on a shaft; a helically coiled outer race; a housing externally supporting the outer race at its extremities; adjustable rings internally supporting the outer race at its extremities; and a ring of rotatable members between the inner and outer races.

In testimony whereof we affix our signatures in presence of two witnesses.

ALBERT EDWARD DABBS.
STANLEY WHITBY SAVAGE.
ALFRED HAROLD HINDLE.

Witnesses:
 ERNALD S. MOSELEY,
 JOHN WILLIAM THOMAS.